Oct. 28, 1941.　　　A. KRUCZEK　　　2,260,996

MOUNTING FOR VISES

Filed Feb. 17, 1941

INVENTOR.
ANDREW KRUCZEK.
BY Louis Chayka

Patented Oct. 28, 1941

2,260,996

UNITED STATES PATENT OFFICE 2,260,996

MOUNTING FOR VISES

Andrew Kruczek, Detroit, Mich.

Application February 17, 1941, Serial No. 379,251

1 Claim. (Cl. 287—12)

My invention pertains to that kind of mountings in which the vise is supported by a column or joint ending in a ball, the latter being located in a split socket with a cam arrangement whereby both parts of the socket may be tightened or loosened as desired. While this arrangement is old, my invention comprises certain features which are new, simple and effective. In particular, my invention refers to novel means to aid in holding the aforesaid ball in a tight frictional embrace within said socket, and to prevent it from changing its relative position therein. For this purpose, I am employing an element which I believe is new in combination with vises, namely, a brake lining of the kind that is used in automobile brakes, as I shall presently describe in detail.

In describing my improvement, I shall describe a vise in which may improvement is shown. It will be understood, however, that the form of the vise may be easily changed and that some other vise and some other mounting of the same class may be easily substituted and that my invention pertains particularly to the feature of having the ball-holding socket provided with a brake lining.

I shall now describe in detail my improvement in mountings for vises, in which.

Similar numerals refer to similar parts throughout the several views.

Figure 1:
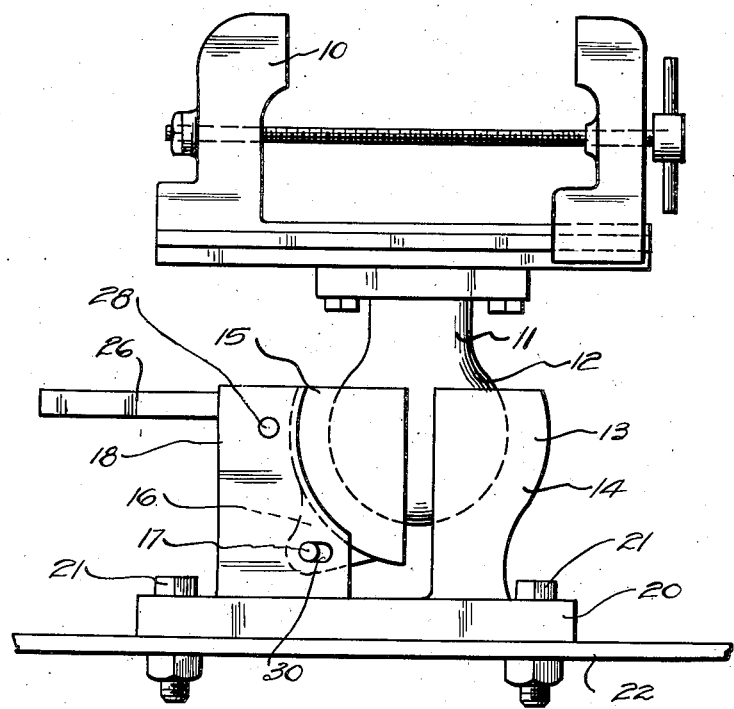
Fig. 1 shows a side view of a vise supported by my improved mounting.
Figure 2:
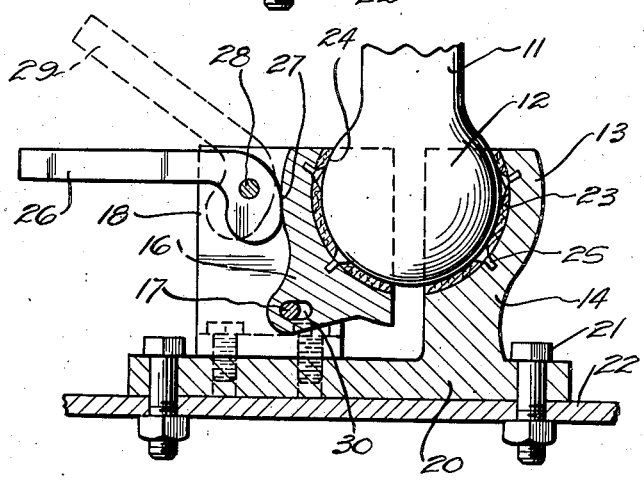
Fig. 2 shows a sectional view of the mounting shown in Fig. 1.

The vise in its conventional form, indicated by numeral 10, is supported by a joint or column 11 terminating in a ball 12. The latter is located in a semi-spherical split socket 13 composed of two members or shells 14 and 15. Member 14 is integrally connected with base 20, while member 15, being the complementary part of socket 13, is provided on its outer surface with an ear 16. By means of said ear, member 15 is hinged on pin 17, the ends of which are held in slot bearings 30 in plates 18. Together, members 14 and 15 form a hollow sphere cut off at the top and serve to accommodate ball 12 supporting joint 11 in such a manner that said joint may be inclined within limits permitted by the construction of the socket towards the base 20 at any angle that may be desirable and convenient. In order to secure a better frictional contact between the ball and shells 14 and 15, I have disposed on the inner surface of the ball member, both within the shell 14 and shell 15, a suitable lining indicated by numerals 23 and 24 respectively. The lining is held in place by rivets 25. The lining may be of the same kind as is used for brakes in automobiles, although it may be made of some other substance. Numeral 22 indicates a platform to which base 20 is secured by means of threaded bolts 21.

Normally, ball 12 is adapted to be moved about in its socket freely without friction. When, however, said ball has been set at a desired angle, it may be secured firmly in the desired position by means of a cam arrangement acting upon the movable member or shell 15 of the split socket 13. The cam arrangement comprises a lever 26, which is adapted to be operated manually, and a cam shoulder 27 turning around a transversely disposed pin 28 supported by side plates 18. The lever is normally in a position shown by dotted lines 29, at which time the shell 15 is loosely held in position. When, however, lever 26 is depressed to a postion shown by solid lines, shoulder 27 bears externally against shell 15, effecting a high frictional contact between ball 12 and the brake lining 23 and 24, within the socket shells 14 and 15 respectively.

It will be evident, as above intimated, that the form of the socket may be changed, also that the cam arrangement may be of a different type. The main element, however, of my disclosure herein refers to the use of brake lining in combination with sockets frictionally holding balls forming the terminating member of other elements to support vises or other such utensils, and I want to claim this improvement specifically whether it is used in the mountng illustrated by me or whether it is used in mountings of similar type. What I, therefore, wish to claim is as follows:

A mounting for an article having a depending supporting column formed with a ball at its lower end, said mounting comprising a base, a hemispherical socket split vertically and having a stationary section and a movable section, the inner surfaces of both the stationary and the movable sections being lined with a braking material to increase friction, the statonary section being fixed at its lower end to said base, bearing plates carried by the base and extending upwardly therefrom in transverse spaced relation to each other, said plates being reduced in width towards their upper ends and having their inner side edges curved longitudinally from their upper ends, lower portions of the bearing plates being formed with horizontally extending slots, an ear extending outwardly from the lower portion of the movable section between said bearing plates, a pin passed through the ear and the slots to mount the movable secttion for pivotal movement and sliding movement towards and away from the stationary section, and a cam pivotally mounted between upper portions of the bearing plates and having an actuating handle for manually turning the cam about its pivot and into engagement with the movable section to shift the movable section towards the stationary section and cause the ball to be frictionally gripped in the socket between the said sections and the pedestal held at an adjusted angle.

ANDREW KRUCZEK.